(12) United States Patent
Ikeda et al.

(10) Patent No.: US 7,841,210 B2
(45) Date of Patent: Nov. 30, 2010

(54) METHOD OF MANUFACTURING GLASS SUBSTRATE AND INFORMATION RECORDING MEDIUM

(75) Inventors: Hiroaki Ikeda, Tokyo (JP); Masaru Suzuki, Tokyo (JP); Kazuna Sasaki, Tokyo (JP); Yumi Mukai, Tokyo (JP); Jun Ozawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 272 days.

(21) Appl. No.: 11/868,381

(22) Filed: Oct. 5, 2007

(65) Prior Publication Data

US 2008/0087045 A1    Apr. 17, 2008

Related U.S. Application Data

(62) Division of application No. 10/337,865, filed on Jan. 8, 2003, now Pat. No. 7,281,394, which is a division of application No. 09/540,886, filed on Mar. 31, 2000, now Pat. No. 6,523,367.

(30) Foreign Application Priority Data

Mar. 31, 1999  (JP)  ................................. 11/94409
Apr. 22, 1999  (JP)  ................................. 11/114990

(51) Int. Cl.
   *C03C 21/00*   (2006.01)
(52) U.S. Cl. ..................... 65/30.1; 65/30.13; 65/30.14
(58) Field of Classification Search .................. 65/30.1, 65/30.13, 30.14

See application file for complete search history.

(56) References Cited

U.S. PATENT DOCUMENTS

| 4,807,074 | A  |   | 2/1989  | Kamo |
| 5,846,280 | A  |   | 12/1998 | Speit |
| 6,119,483 | A  |   | 9/2000  | Takahashi et al. |
| 6,134,918 | A  |   | 10/2000 | Eto et al. |
| 6,383,404 | B1 |   | 5/2002  | Sakai et al. |
| 6,523,367 | B1 | * | 2/2003  | Ikeda et al. .................. 65/30.1 |
| 6,534,120 | B1 |   | 3/2003  | Ozawa et al. |
| 6,595,028 | B1 |   | 7/2003  | Miyamoto et al. |
| 7,281,394 | B2 | * | 10/2007 | Ikeda et al. .................. 65/30.1 |

FOREIGN PATENT DOCUMENTS

| JP | 10-194785 | 7/1998 |
| JP | 10-194786 | 7/1998 |

* cited by examiner

*Primary Examiner*—Carlos Lopez
(74) *Attorney, Agent, or Firm*—Sughrue Mion, PLLC

(57) ABSTRACT

In a method of manufacturing a glass substrate for an information recording medium including a step for chemically strengthening the glass substrate by contacting the glass substrate with chemical strengthening processing liquid containing chemical strengthening salt, concentration of Fe and Cr is 500 ppb or less in said chemical strengthening salt, respectively. The concentration may be detected by the use of an ICP (Inductively Coupled Plasma) emission spectrometry analyzing method or a fluorescent X-ray spectroscopy analyzing method.

12 Claims, 3 Drawing Sheets

METHOD OF MANUFACTURING GLASS SUBSTRATE AND INFORMATION RECORDING MEDIUM

This is a divisional of application Ser. No. 10/337,865 filed Jan. 8, 2003 now U.S. Pat. No. 7,281,394, which is a divisional of application Ser. No. 09/540,886, filed Mar. 31, 2000 now U.S. Pat. No. 6,523,367. The entire disclosures of the prior applications, application Ser. Nos. 10/337,865 and 09/540,886 are hereby incorporated by reference,

BACKGROUND OF THE INVENTION

This invention relates to a method of manufacturing a magnetic recording medium used as a recording medium for an information processing apparatus and the like, and a method of manufacturing a substrate thereof.

Recently, a magnetic disk has been used as an information recording medium. The magnetic disk is structured by forming a thin-film, such as, a magnetic layer, on a substrate. In this event, an aluminum substrate or a glass substrate has been generally used as the substrate.

However, the glass substrate, which can further narrow a space (namely, a flying height with respect to a magnetic head) between a magnetic head and a magnetic recording medium in comparison with the aluminum substrate, has been gradually replaced by the aluminum substrate in accordance with high recording density in the recent years.

Such a glass substrate is generally manufactured by chemically strengthening to enhance strength and endure for impact when the glass substrate is mounted for a magnetic disk drive. Further, a surface of the glass substrate is polished with high accuracy so as to lower the flying height of the magnetic head to the utmost. Thereby, high recording density has been realized.

In the meantime, a thin-film head has been recently replaced by a magneto-resistive head (namely, MR head) in the magnetic head to realize the high recording density other than the glass substrate.

High surface flatness of the magnetic disk is required to realize a low flying height necessary for the above-mentioned high recording density. In addition, when the MR head is used, the surface of the magnetic recording medium must have high flatness from the viewpoint of thermal asperity.

When the magnetic disk has projections on the surface of the magnetic disk, the MR head is affected by the projections to generate heat for the MR head, and resistance value of the head is fluctuated to cause to occur an error operation for electromagnetic conversion by the heat. This phenomenon is defined as the above-mentioned thermal asperity.

Further, even when the surface of the magnetic disk has the high flatness, if the surface of the magnetic disk has the projections which cause the thermal asperity, head crush brings about by the projections, and a magnetic film constituting the magnetic disk is peeled in the cause of the head crush. Thus, the projections give an adverse affect for the magnetic disk.

Thus, demand has been gradually enhanced about the high surface flatness of the magnetic disk to realize the low flying height and prevent the head crush and the thermal asperity. The substrate surface having the high flatness is finally required to obtain the high surface flatness of the magnetic disk. However, the high recording density can be no longer realized only by polishing the substrate surface with the high accuracy.

More specifically, even when the substrate surface is polished with the high accuracy, the high flatness can not be realized in case that contaminants are attached on the substrate. Although the contaminants have been naturally and conventionally removed, the contaminants, which have been placed on the substrate and conventionally have been permitted, cause a problem in a recent level with respect to the high recording density.

In this case, excessively small iron powder and stainless steel piece, which can not remove by the use of a normal washing process, are exemplified as this kind of contaminant. For example, it has been confirmed that when a chemical strengthening process is performed on the condition that particles, such as, the iron powders are attached on the glass substrate or that the particles are attached on the glass substrate in the chemical strengthening processing liquid, irons are strongly attached on the glass substrate to form island portions (namely, the projections) through oxidation reaction occurred in the chemical strengthening process and heat applied in the process.

It has been found out that when the thin-film, such as, the magnetic film is laminated on the glass substrate, the island portions (projections) are formed on the surface of the magnetic disk to prevent the low flying height and to occur the head crush and the thermal asperity.

Therefore, investigation has been fully made about a cause in which such fine iron powders are attached to the glass substrate. As a result, it has been confirmed that the iron powders are contained in a chemical strengthening chamber for performing the chemical strengthening process, and in particular, a large number of iron powders are contained in a chemical strengthening salt itself.

More specifically, when the number of the iron powders has been investigated for each generation factor, the number of the iron powders contained in the chemical strengthening salt itself before the chemical strengthening salt (sodium nitrate or potassium nitrate) is prepared to make the chemical strengthening processing liquid is excessively high.

Further, it has been found out that the chemical strengthening salt itself contains the other particles which give an adverse affect for the information recording medium by attaching to the glass substrate for the information recording medium.

Meanwhile, disclosure has been made about a technique for removing the iron powders contained in atmosphere of the chemical strengthening chamber for performing the chemical strengthening process and preventing the iron powders from contaminating the chemical strengthening processing liquid in Japanese Unexamined Patent Publication No. H10-194785.

Another disclosure has been made about a technique for removing the iron powders contaminated from the atmosphere in the chemical strengthening chamber into the chemical strengthening processing liquid by filtering the chemical strengthening processing liquid by the use of a filter having superior corrosion resistance to high temperature, such as, a microsieve (namely, wire cloth in which holes are opened by etching) In Japanese Unexamined Patent Publication No. H10-194786.

In this event, the former method is effective for removing the iron powders contained in the atmosphere in the chemical strengthening chamber for performing the chemical strengthening process.

Although the latter method has a constant effect, the number of the iron powders contained the chemical strengthening salt itself before making the chemical strengthening processing liquid is excessively high as mentioned above, and as a result, the latter method is not sufficiently effective for removing the iron powders.

Further, the latter method is not enough to remove the other particles which attach to the glass substrate for the information recording medium in the chemical strengthening process and give the adverse affect for the information recording medium.

Moreover, the chemical strengthening process is carried out by replacing ions contained in the glass by ions contained in original liquid for ion exchange, or distribution with respect to index of refraction is adjusted in a glass substrate for an electron device (including a glass substrate for a photomask, a glass substrate for a phase shift mask, or a glass substrate for an information recording medium, and hereinafter, will be used as the same meaning) or a glass substrate for an optical device in addition to above-mentioned glass substrate for the information recording medium.

In such glass substrates, the original liquid for ion exchange contains Fe and Cr, and thereby, the efficiency of ion exchange is lowered or the island portions are formed. For example, the island portions shield a light beam, and as a result, a desired characteristic may not obtained.

SUMMARY OF THE INVENTION

It is therefore an object of this invention to provide a method of manufacturing a glass substrate for a magnetic recording medium which is capable of effectively suppressing attachment of particles which attach to a glass substrate for an information recording medium in a chemical strengthening process and which give an adverse affect for an information recording medium.

In particular, it is another object of this invention to provide a method of manufacturing a glass substrate for a magnetic recording medium which is capable of effectively suppressing formation of projections formed by attachment of fine iron powders to a glass substrate in a chemical strengthening process.

It is still another object of this invention to provide a method of manufacturing a magnetic recording medium which is capable of effectively suppressing attachment of particles which attach to a glass substrate for an information recording medium in a chemical strengthening process and which give an adverse affect for an information recording medium, and therefore, of obtaining an information recording medium having high quality and a slight of defects It is further another object of this invention to provide a method of manufacturing a magnetic disk which is capable of realizing a low flying height and preventing head crush and thermal asperity.

It is still other object of this invention to provide a method of manufacturing an electron device or an optical device which is capable of effectively suppressing attachment of particles, which give an adverse affect by attaching to a glass substrate for an electron device or a glass substrate for an optical device in an ion exchange step, and therefore, of having a slight of defects.

Inventors have proceeded research and development to achieve the above-mentioned objects. As a result, it has been found out that island portions (projections) are formed even when a size of an iron powder (including iron oxide or stainless steel) is 1 μm or less (for example, 0.2 μm). Further, it is excessively effective to previously remove particles, such as, the iron powders contained in chemical strengthening salt itself.

To this end, it has been found out that it is extremely effective to perform quantitative analysis of iron or chromium contained in the chemical strengthening salt, and thereby, this invention has been completed.

Namely, this invention has the following structures.

(Structure 1)

In a method of manufacturing a glass substrate for an information recording medium including a step for chemically strengthening the glass substrate by contacting the glass substrate with chemical strengthening processing liquid containing a chemical strengthening salt, concentration of Fe and Cr is 500 ppb or less in said chemical strengthening salt, respectively. The concentration is detected by the use of an ICP (Inductively Coupled Plasma) emission spectrometry analyzing method or a fluorescent X-ray spectroscopy analyzing method.

(Structure 2)

In the method of the structure 1, the concentration of Fe and Cr is 100 ppb or less in said chemical strengthening salt, respectively. The concentration is detected by the use of the ICP (Inductively Coupled Plasma) emission spectrometry analyzing method or the fluorescent X-ray spectroscopy analyzing method.

(Structure 3)

In the method of the structure 1, the concentration of Fe and Cr are 20 ppb or less in said chemical strengthening salt, respectively. The concentration is detected by the use of the ICP (Inductively Coupled Plasma) emission spectrometry analyzing method or the fluorescent X-ray spectroscopy analyzing method.

(Structure 4)

In the method of either one of structures 1 through 3, quantitative analysis of element and concentration of impurity such as particles of chemical strengthening of the chemical strengthening salt is carried out by the use of the an ICP (Inductively Coupled Plasma) emission spectrometry analyzing method or the fluorescent X ray spectroscopy analyzing method on the basis of a calibration curve. The calibration curve is determined by standard solutions each having different concentrations of Fe, Cr. The concentrations of Fe, Cr of chemical strengthening salt are determined by the calibration curve, after analyzing intensity of the atomic emissions of filtering solution dissolved with the chemical strengthening salt in solvent by a filter, dissolving particles captured by the filter in acid, and measuring a known concentration sample in advance.

(Structure 5)

In a method of manufacturing a glass substrate for an information recording medium including a step for chemically strengthening the glass substrate by contacting the glass substrate with chemical strengthening processing liquid containing chemical strengthening salt, the number of particles having a particle diameter of 0.2 μm or more is 120000/g or less in the chemical strengthening salt. The number is determined from a difference between the particle number in a sample dissolved with the chemical strengthening salt in a reference liquid measured by the use of a liquid particle counter and the particle number in the reference liquid.

(Structure 6)

In a method of manufacturing a glass substrate for an information recording medium including a step for chemically strengthening the glass substrate by contacting the glass substrate with chemical strengthening processing liquid containing chemical strengthening salt, the number of particles having a particle diameter of 0.2 μm or more is 900/mm$^2$ or less in the chemical strengthening salt when the particles contained in the chemical strengthening salt of 1 g are captured by a filter having a minimum capturing particle diameter of 0.2 μm and a diameter of 13 mm in case that secondary electron image or back-scattered electron image is observed by a scanning electron microscope (SEM) by the use of a secondary electron detector or a back-scattered electron image detector.

(Structure 7)

In a method of the structure 6, the number of the particles is 500/mm$^2$ or less in the chemical strengthening salt.

(Structure 8)

In a method of the structure 6, the number of the particles is 30/mm$^2$ or less in the chemical strengthening salt.

(Structure 9)

In a method of manufacturing a glass substrate for an information recording medium including a step for chemically strengthening the glass substrate by contacting the glass substrate with chemical strengthening processing liquid containing chemical strengthening salt, the chemical strengthening salt does not become a black color or a gray color or a red brown color when the chemical strengthening salt is analyzed by the use of colorimetric analysis.

(Structure 10)

In a method of manufacturing a glass substrate for an information recording medium including a step for chemically strengthening the glass substrate by contacting the glass substrate with chemical strengthening processing liquid containing chemical strengthening salt, when solution dissolved with said chemical strengthening salt in solvent is filtered by a filter, and particles are captured by the filter, a color concentration of the filter becomes a constant reference value or less in the chemical strengthening salt.

(Structure 11)

In a method of inspecting chemical strengthening salt, the analyzing method of the structures 1 through 10 is used.

(Structure 12)

In a method of the structures 1 through 10, the glass substrate for the information recording medium comprises a glass substrate for a magnetic disk.

(Structure 13)

In a method of the structure 12, the glass substrate for the magnetic disk comprises a glass substrate for a magnetic disk which is used by combining with a magneto-resistive head (MR head) or a giant magneto-resistive head (GMR head).

(Structure 14)

In a method of manufacturing an information recording medium, at least a recording layer is formed on the glass substrate obtained by the manufacturing method of the glass substrate for the information recording medium of the structures 1 through 10.

(Structure 15)

In a method of manufacturing a magnetic disk, at least a magnetic layer is formed on the glass substrate obtained by the manufacturing method of the glass substrate for the information recording medium of the structures 1 through 10.

(Structure 16)

In a method of manufacturing an optical glass substrate, including the step of exchanging ions in a glass component with ions in an ion exchange processing liquid by dipping the glass component in the ion exchange processing liquid, a salt satisfying the conditions described in any one of the structures 1 through 3 and 5 through 10 is used for the ion exchange processing liquid.

(Structure 17)

In a method of the structure 16, the optical glass substrate is a glass substrate for an electronic device or a glass substrate for an optical device and the ion exchange processing liquid is a chemical strengthening processing liquid containing a chemical strengthening salt.

(Structure 18)

In a method of manufacturing a glass substrate for an information recording medium including a chemical strengthening step for strengthening the glass substrate by replacing a part of first ions contained in the glass substrate by second ions in processing liquid having an ion diameter larger than the first ion by contacting the glass substrate with chemical strengthening processing liquid containing a chemical strengthening salt, content of particles is suppressed in order to prevent generation of thermal asperity in the chemical strengthening salt. The particles cause the thermal asperity.

(Structure 19)

In a method of manufacturing a glass substrate for an information recording medium including a chemical strengthening step for strengthening the glass substrate by replacing a part of first ions contained in the glass substrate by second ions in a processing liquid having an ion diameter larger than the first ion by contacting the glass substrate with chemical strengthening processing liquid containing chemical strengthening salt, the number of particles having a particle diameter of 0.2 μm or more contained in the chemical strengthening salt is 12000/ml or less.

(Structure 20)

In a method of the structure 19, a ratio of the particles having the particle diameter of 0.2 μm or more is 25% or less in the chemical strengthening salt.

(Structure 21)

In a method of the structure 19 or 20, the number of particles having a particle diameter of 0.2 μm or more contained the chemical strengthening salt is 4000/ml or less.

(Structure 22)

In a method of the structures 18 through 21, the particle contains iron.

(Structure 23)

In a method of the structures 18 through 22, the glass substrate for the information recording medium comprises a glass substrate for a magnetic disk.

(Structure 24)

In a method of the structure 23, the glass substrate for the magnetic disk comprises a glass substrate for a magnetic disk which is used by combining with a magneto-resistive head (MR head) or a giant magneto-resistive head (GMR head).

(Structure 25)

In a method of manufacturing an information recording medium, at least a recording layer is formed on the glass substrate obtained by the manufacturing method of the glass substrate for the information recording medium of the structures 18 through 24.

(Structure 26)

In a method of manufacturing an magnetic disk, at least a magnetic layer is formed on the glass substrate obtained by the manufacturing method of the glass substrate for the information recording medium of the structures 18 through 24.

(Structure 27)

A method of manufacturing a glass substrate for a magnetic disk, comprising the steps of:

preparing a glass substrate;

judging whether or not the amount of particles contained in a chemical strengthening salt itself is not greater than a predetermined reference value;

reducing, if the predetermined reference value is exceeded, the amount of particles contained in the chemical strengthening salt itself to a level not greater than the predetermined reference value;

preparing a chemical strengthening processing liquid by mixing the chemical strengthening salt containing the particles in an amount not greater than the predetermined reference value; and chemically strengthening the glass substrate by replacing a part of first ions contained in the glass substrate by second ions contained in the processing liquid and having an ion diameter larger than that of the first ions by contacting the glass substrate with the chemical strengthening processing liquid.

(Structure 28)

In the method of the structure 27, the predetermined reference value is determined by preliminarily obtaining correlation between the amount of particles contained in the chemical strengthening salt itself and a glide height, selecting, with reference to the correlation, a particular amount of particles corresponding to a desired glide height, and setting the particular amount as the predetermined reference value.

(Structure 29)

In a method of manufacturing a magnetic disk, at least a magnetic layer is formed on a principal surface of the glass substrate for the magnetic disk of the structure 27 or 28.

According to the structures 1-3, the concentration of Fe and Cr is 500 ppb or less in the chemical strengthening salt, respectively. The concentration is detected by the use of an ICP (Inductively coupled Plasma) emission spectrometry analyzing method or a fluorescent X-ray spectroscopy analyzing method.

Consequently, formation of an island portion can be effectively suppressed. In this case, fine iron powder in chemical strengthening processing liquid is attached to the glass substrate, and thereby, the island portion is formed. Therefore, a low flying height can be achieved, and the head crush and the thermal asperity can be prevented in the magnetic disk.

When the concentration of Fe and Cr exceeds 500 ppb, a ratio, in which the island portion is formed, becomes excessively high, and the height of the island portion and the density of the island portions become high during the chemical strengthening step. Further, the faulty rate becomes high in the glide test of the 1.2µ inch height, and the probability of reproduction error due to the thermal asperity also becomes high.

From the same view, the concentration of Fe and Cr is preferably 250 ppb or less, and more preferably, 100 ppb or less, 20 ppb or less, 10 ppb or less, 5 ppb or less, and 1 ppb or less.

In the ICP (Inductively Coupled Plasma) emission spectrometry analyzing method, elements to be analyzed and contained in the sample are vaporized and excited by inductively coupled plasma generated by inductively coupling high frequency power, and the quantitative analysis is carried out by measuring the obtained emission intensity in an atom spectrum line (JIS K 0116).

According to the structure 4, quantitative analysis of element and concentration of the chemical strengthening salt is carried out by the use of the an ICP (Inductively Coupled Plasma) emission spectrometry analyzing method or the fluorescent X-ray spectroscopy analyzing method on the basis of a calibration curve. The calibration curve is determined by filtering solution dissolved with the chemical strengthening salt in solvent by a filter, dissolving particles captured by the filter in acid, and measuring a known concentration sample in advance.

Consequently, the metal based particles, such as, iron or chromium, are dissolved in acid, and the quantitative analysis can be performed by the ICP (Inductively Coupled Plasma) emission spectrometry analyzing method having high sensitivity.

According to the structure 5, the particle number is determined from the difference between the particle number in the sample dissolved with the chemical strengthening salt in the reference liquid and the particle number in the reference liquid (namely, blank).

Thereby, an accurate measuring value of the particle number having a slight of variation can be obtained, and an accurate judgement is possible on the basis of the measuring value.

Further, the number of particles having a particle diameter of 0.2 µm or more is 120000/g or less in the chemical strengthening salt. In consequence, the attachment of the particles, which give an adverse affect for the information recording medium by attaching to the glass substrate for the information recording medium in the chemical strengthening processing liquid, can be effectively suppressed.

In particular, fine iron powder in the chemical strengthening processing liquid attach to the glass substrate. In this case, the formation of the island portions can be effectively suppressed.

In this event, the particle has a particle diameter of 0.2 µm or more. This is because the particles having the particle diameter of not exceeding 0.2 µm do not give an affect for the formation of the island portion which causes the thermal asperity.

When the number of particles having a particle diameter of 0.2 µm or more exceeds 120000/g, the fine iron powder in the chemical strengthening processing liquid attaches to the glass substrate, and a ratio, in which the island portion is formed, becomes high. Consequently, the number of the island portions becomes high, and the height and density of the island portion also becomes high. Further, this is not preferable because a ratio, which the thermal asperity and the head crush occur, becomes high.

Similarly, when the number of particles having a particle diameter of 0.2 µm or more exceeds 120000/g, the attachment number of the particles, which give an adverse affect for the information recording medium by attaching to the glass substrate for the information recording medium in the chemical strengthening processing liquid, becomes high. This is not preferable.

From the same viewpoint, the number of particles having a particle diameter of 0.2 µm or more contained in the chemical strengthening salt is preferably 8000/g or less, and more preferably, 4000/g or less. This reason is explained as follows. Namely, the number of the particles contained in the chemical strengthening salt is directly reflected for the generation of the island portion in the chemical strengthening processing liquid and the attachment of the particles. Therefore, the probability for generating the island portions or the attachment number of the particles can be reduced by reducing the number of the particles contained in the chemical strengthening salt.

Further, the density of the island portions is desirably $0.002/mm^2$ or less, and more desirably, $0.0003/mm^2$ or less.

According to the structures 6~8, when secondary electron image or back-scattered electron image is observed by a scanning electron microscope (SEM) by the use of a secondary electron detector or a back-scattered electron detector, the number of particles (such as iron powder, stainless steel piece) having a particle diameter of 0.2 µm or more is $900/mm^2$ or less in the chemical strengthening salt when the particles contained in the chemical strengthening salt of 1 g are captured by a filter having a minimum capturing particle diameter of 0.2 µm and a diameter of 13 mm.

Thereby, the fine iron powder in the chemical strengthening processing liquid attaches to the glass substrate and the formation of the island portion can be effectively suppressed.

Consequently, the low flying height can be achieved, and the head crush and the thermal asperity can be prevented in the magnetic disk.

When the number of the particles (such as iron powder and stainless steel piece) exceeds 500/mm$^2$, a ratio, in which the island portion is formed, becomes excessively high, and the height and density of the island portion also become high. Further, the faulty rate becomes high in the glide test of the 1.2µ a inch height, and the probability of the reproduction error due to the thermal asperity also becomes high. The number of the particles (such as the iron powder and stainless steel piece) is preferably 500/mm$^2$ or less, 300/mm$^2$ or less, 100/mm$^2$ or less, 30/mm$^2$ or less, and more preferably, 10/mm$^2$ or less.

According to the structure 9, the chemical strengthening salt does not become a black color or a gray color or a red brown color when the chemical strengthening salt is analyzed by the use of calorimetric analysis.

Thereby, the fine iron powder in the chemical strengthening processing liquid attaches to the glass substrate and the formation of the island portion can be effectively suppressed. Consequently, the low flying height can be achieved, and the head crush and the thermal asperity can be prevented in the magnetic disk.

When the chemical strengthening salt becomes the black color or the gray color or the red brown color in case that the chemical strengthening salt is analyzed by the use of the calorimetric analysis, a ratio, in which the island portion is formed during the chemical strengthening step, becomes excessively high, and the height and density of the island portion also become high. Further, the faulty rate becomes high in the glide test of the 1.2µ inch height, and the probability of the reproduction error due to the thermal asperity also becomes high.

According to the structure 10, the solution of the chemical strengthening salt is filtered by the filter, particles are captured by the filter, and the color concentration of the filter becomes a constant reference value or less in the chemical strengthening salt.

Thereby, the fine iron powder in the chemical strengthening processing liquid attaches to the glass substrate and the formation of the island portion can be effectively suppressed. Consequently, the low flying height can be achieved, and the head crush and the thermal asperity can be prevented in the magnetic disk.

When the color concentration of the filter is denser than the constant reference value, a ratio, in which the island portion is formed during the chemical strengthening step, becomes excessively high, and the height and density of the island portion also become high. Further, the faulty rate becomes high in the glide test of the 1.2µ inch height, and the probability of the reproduction error due to the thermal asperity also becomes high.

According to the structure 11, the analyzing method of the structures 1 through 10 is used as the inspecting method of the chemical strengthening salt.

According to the structure 12, the glass substrate for the information recording medium is a glass substrate for a magnetic disk. Thereby, the formation of the island portion, which causes the head crush, can be effectively suppressed. Therefore, the low flying height can be realized, and the head crush and the thermal asperity can be prevented in the magnetic disk.

According to the structure 13, the glass substrate for the magnetic disk may be a glass substrate for a magnetic disk which is used by combining with a magneto-resistive head. Thereby, the formation of the island portion, which causes the thermal asperity and the head crush, can be effectively suppressed. As a result, the low flying height can be realized. When the magneto-resistive head is used, this is particularly effective because the low flying height is required.

According to the structure 14, the glass substrate obtained by the manufacturing method of the glass substrate for the information recording medium of the structures 1 through 10 is used. Thereby, the attachment of the particles, which give an adverse affect for the information recording medium by attaching to the glass substrate for the information recording medium in the chemical strengthening processing liquid, can be effectively suppressed. Further, the information recording medium having high quality and a slight of defects can be obtained.

According to the structure 15, the glass substrate obtained by the manufacturing method of the glass substrate for the information recording medium of the structures 1 through 10 is used.

Thereby, the fine iron powder in the chemical strengthening processing liquid attaches to the glass substrate and the formation of the island portion can be effectively suppressed. Consequently, the low flying height can be achieved, and the head crush and the thermal asperity can be prevented in the magnetic disk.

According to the structure 16-17, in a method of manufacturing an optical glass substrate, including the step of exchanging ions in a glass component with ions in an ion exchange processing liquid by dipping the glass component in the ion exchange processing liquid, a salt satisfying the conditions described in any one of the structures 1 through 3 and 5 through 10 is used for the ion exchange processing liquid. The optical glass substrate is a glass substrate for an electronic device or a glass substrate for an optical device and the ion exchange processing liquid is a chemical strengthening processing liquid containing a chemical strengthening salt.

Consequently, the island portion is not formed on the chemically strengthened glass substrate or the glass substrate in which distribution with respect to index of refraction is adjusted, and the electron device or the optical device having high quality can be obtained.

According to the structure 16, the original liquid for the ion exchange may be a chemical strengthening processing liquid containing chemical strengthening salt. This is effective to fabricate the chemically strengthened glass (used in the electron device or the optical device). Furthermore, the reduction of the efficiency of the ion leakage can be suppressed/

According to the structure 18, content of particles, which are contained in the chemical strengthening salt itself and cause the thermal asperity, is suppressed.

Thereby, the fine iron powder in the chemical strengthening processing liquid attached to the glass substrate and the formation of the island portion can be effectively suppressed. Consequently, the low flying height can be achieved, and the head crush and the thermal asperity can be prevented in the magnetic disk.

According to the structure 19, the number of particles having a particle diameter of 0.2 µm or more is 12000/ml or less in the chemical strengthening salt. In consequence, the attachment of the particles, which give an adverse affect for the information recording medium by attaching to the glass substrate for the information recording medium in the chemical strengthening processing liquid, can be effectively suppressed.

In particular, fine iron powder in the chemical strengthening processing liquid attaches to the glass substrate. The formation of the island portions can be effectively suppressed.

In this case, the particle has a particle diameter of 0.2 μm or more. This is because the particles having the particle diameter of not exceeding 0.2 μm do not give an affect for the formation of the island portion which causes the thermal asperity.

When the number of particles having a particle diameter of 0.2 μm or more exceeds 12000/ml, the fine iron powder in the chemical strengthening processing liquid attaches to the glass substrate, and a ratio, in which the island portion is formed, becomes high. Consequently, the number of the island portions also becomes high, and the height and density of the island portion also becomes high. Further, this is not preferable because a ratio, which the thermal asperity and the head crush occur, becomes high.

Similarly, when the number of particles having a particle diameter of 0.2 μm or more exceeds 12000/ml, the attachment number of the particles, which give an adverse affect for the information recording medium by attaching to the glass substrate for the information recording medium in the chemical strengthening processing liquid, becomes high. This is not desirable.

From the same viewpoint, the number of particles having a particle diameter of 0.2 μm or more contained in the chemical strengthening salt is preferably 8000/ml or less, and more preferably, 4000/ml or less. This reason is explained as follows. Namely, the number of the particles contained in the chemical strengthening salt is directly reflected for the generation of the island portion in the chemical strengthening processing liquid and the attachment of the particles. Therefore, the probability for generating the island portions or the attachment number of the particles can be reduced by reducing the number of the particles contained in the chemical strengthening salt.

Further, the density of the island portions is desirably $0.002/mm^2$ or less, and more desirably, $0.0003/mm^2$ or less.

In this case, the number of the particles contained in the chemical strengthening salt was measured by the following predetermined method.

Namely, the chemical strengthening salt (the potassium nitrate and the sodium nitrate) was dissolved in the super pure water of 90 ml with 10 g respectively. Herein, it is to be noted that the super pure water means water which is sufficiently cleaned and does not contain the particles that give an affect for the measurement.

The solution was successively measured three times by the particle counter (made by Lion Ltd. or PMS Ltd.) for the liquid with 5 ml.

Further, the number of the particles (the total of the particle number in each particle size) contained per 1 ml was determined and converted, and these average values were decided as the particle number. In this case, the total of the particle number corresponds to the total of the number of the particles which exist in a range of each particle size which is arbitrarily determined.

According to the structure 20, a ratio of the particles, which give a large affect for the formation the island portion (projection) and have a large particle diameter (specifically, the particle diameter of 0.2 μm or more) is 25% or less in the chemical strengthening salt. Thereby, the formation of the island portion (projection) can be effectively prevented. From the same viewpoint, the ratio is preferably 20% or less, and more preferably, 15% or less.

According to the structure 21, the number of particles having a particle diameter of 2 μm or more contained said chemical strengthening salt is 4000/ml or less. Thereby, the formation of the island portion (projection) can be further effectively prevented.

This reason is explained as follows. Namely, the particle having the particle diameter of 2 μm or more gives a strong affect in comparison with the particle having not exceeding 2 μm. Further, the particle diameter of the particle of iron, which causes the thermal asperity, is about 2 μm or more.

According to the structure 22, the particle contains a particle of iron. When the particle contained in the chemical strengthening salt was analyzed, O, Na, Mg, Al, Si, Ci, Fe, Cr and the like were detected. In particular, when the particle is Fe (iron), and the particle (iron) is attached to the glass substrate in the chemical strengthening processing liquid, the island portion (projection) dissolved with iron is formed on the glass substrate by the oxidation reaction occurred in the chemical strengthening process and the heat applied in this process. These island portions cause the thermal asperity and the head crush with high probability.

Meanwhile, when the particle has a relatively large size, the particles are dissolved to form the island portions (projections). In the meantime, the particle has a relatively small size, the particles aggregate and dissolve to form the island portions (projections). Such phenomenon has been confirmed by a microscope.

Therefore, a remarkable effect particularly appears by controlling quantity (the number) of the particles, such as, the iron contained in the chemical strengthening salt in the magnetic disk.

Further, the particle of the iron contains the iron oxide and SUS in addition to the iron. Moreover, metal, such as, Cr and Al is exemplified as material of the particle for forming the island portion (projection) by the above-mentioned oxidation reaction and the heat.

According to the structure 23, when the glass substrate for the information recording medium is a glass substrate for a magnetic disk, the formation of the island portion, which causes the head crush, can be effectively suppressed. In consequence, the low flying height can be achieved and the head crush can be prevented.

According to the structure 24, when the glass substrate for the magnetic disk is a glass substrate for a magnetic disk which is used by combining with a magneto-resistive head, the formation of the island portion, which causes the thermal asperity, can be effectively suppressed. As a result, the low flying height can be realized. When the magneto-resistive head is used, this is particularly effective because the low flying height is required.

According to the structure 26, the glass substrate obtained by the manufacturing method of the glass substrate for the information recording medium of the structures 18 through 24 is used.

Thereby, the fine iron powder in the chemical strengthening processing liquid attaches to the glass substrate and the formation of the island portion can be effectively suppressed. Consequently, the low flying height can be achieved, and the head crush and the thermal asperity can be prevented in the magnetic disk.

According to the structure 27 and 28, a correlation between a content of particles contained in chemical strengthening salt itself and a glide height is determined in advance. The content of the particles, which becomes a desired glide characteristic, is determined as a reference setting value from the correlation. It is judged that the content of the particles contained in the chemical strengthening salt itself is the predetermined reference setting value or less. The content of the particles contained in the chemical strengthening salt itself is set to the predetermined setting value or less when the content exceeds the reference setting value.

Thereby, chemical strengthening processing liquid can be made by preparing the chemical strengthening salt. Therefore, the generation of the island portion or the attachment of the particles can be reduced in the chemical strengthening process.

In this case, the reference setting value can be selected in accordance with a permitted level of defect required for the information recording medium. Further, the reference setting value is determined such that a magnetic head is arranged in opposition to a principal surface of a magnetic disk (or a glass substrate), the magnetic disk is relatively moved for the magnetic disk (or the glass substrate) with a predetermined height, and a desired glide height characteristic is obtained.

In other words, the reference setting value is determined on the basis of the result of the glide test, and thereby, the head crush or the thermal asperity can be effectively prevented. Herein, it is to be noted that the desired glide characteristic may mean that generating rate of hit and crush becomes 0% in the glide height of $1.2\mu$ inch or less.

The reference value in the structure 27 may be determined by obtaining correlation between the amount of particles contained in the chemical strengthening salt itself and a glide height, selecting, with reference to the correlation, a particular amount of particles corresponding to a desired glide height, and setting the particular amount as the reference value, as described in the structure 28. Alternatively, the reference value may be determined by obtaining the correlation between the amount of particles and the occurrence ratio of the thermal asperity, the correlation between the amount of particles and the defect ratio in the glide test, the correlation between the amount of particles and the height and the density of the island portion, and so on, selecting a particular amount of particles contained in the chemical strengthening salt itself so that the magnetic disk has desired characteristics, and setting the particular amount as the reference value.

According to the structure 29, at least a magnetic layer is formed on a principal surface of the glass substrate for the magnetic disk of the structure 27 or 28. Thereby, the low flying height can be achieved, and the head crush and the thermal asperity can be prevented in the magnetic disk.

In this case, the particle in this invention contains a particle of iron. When the particle contained in the chemical strengthening salt was analyzed, O, Na, Mg, Al, Si, Cl, Fe, Cr and the like were detected. In particular, when the particle is Fe (iron), the particle (iron) is attached to the glass substrate in the chemical strengthening-processing liquid. In this case, the particles are strongly attached onto the glass substrate by the oxidation reaction occurred in the chemical strengthening process and the heat applied in this process to form the island portions (projections). These island portions cause the thermal asperity and the head crush with high probability.

Meanwhile, when the particle has a relatively large size, the particle is strongly attached to form the island portions (projections). In the meantime, the particle has a relatively small size, the particles aggregate and are strongly attached to form the island portion (projection). Such phenomenon has been confirmed by a microscope.

Therefore, a remarkable effect particularly appears by controlling quantity of the particles, such as, the iron contained in the chemical strengthening salt in the magnetic disk.

Further, the particle of the iron contains the iron oxide and the stainless steel in addition to the iron. Moreover, Ti, Al, Cl, Ce, and a glass piece are exemplified as the other material of the particle for forming the island portion (projection) by the above-mentioned oxidation reaction and the heat.

Subsequently, description will be made about the method of manufacturing the glass substrate for the information recording medium.

In this invention, quantity (the number) and concentration of the particles, such as, the iron contained in the chemical strengthening salt itself are analyzed by the above-mentioned analyzing method, and the chemical strengthening salt satisfying a reference value or less is used. This is a feature of this invention.

Thus, it is judged by the analysis that the quantity of the particles contained in the chemical strengthening salt itself falls within the range of the predetermined reference value or less. As a result of the judgement, the chemical strengthening salt of the reference value or less is prepared, and thereby, the chemical strengthening processing liquid can be made such that the quantity of the particles falls within the range the predetermined value or less. Consequently, generation of the island portions and the attachment of the particles can be reduced in the chemical strengthening processing step. Herein, it is to be noted that the reference value can be set in accordance with a permitted level of the defects required for the information recording medium.

For example, the above-mentioned reference value is determined in the following manner. Namely, the magnetic head is arranged in opposite to a principal surface of the magnetic disk (or the glass substrate), and the magnetic head is relatively moved for the magnetic disk (or the glass substrate) with a predetermined glide height to obtain a desired glide characteristic.

In other words, the head crush and the thermal asperity can be effectively prevented by determining the reference value on the basis of the result of the glide test. For example, the desired glide characteristic means that the glide height is $1.2\mu$ inch or less, and generating rate of hit or crush becomes 0%.

For instance, the particles are removed by the use of capturing means, such as, a filter on the condition that the chemical strengthening salt is dissolved in water to remove the particles contained in the chemical strengthening salt itself on the basis of the above-mentioned analysis result.

The quantity of the particles contained in the chemical strengthening salt can be controlled to the desired quantity or concentration by selecting performance (minimum capturing particle size) or the kind of the filter.

For example, the desired quantity means that the content of the particles of the particle diameter of 0.2 $\mu$m or more is 12000/ml or less, or 4000/ml or less.

Further, a plurality of filters having different minimum capturing particle sizes are used. Thereby, after the particle having a large particle size is removed by the filter having a large minimum capturing particle size, the particle having a small particle size is removed by the filter having a small minimum capturing particle size.

It is unnecessary to use reagent refined with high purity as all components except for the chemical strengthening salt in this invention. In particular, the chemical strengthening salt, which is removed and cleaned only particles that gives an adverse affect for the iron powder or the information recording medium, is used, and thereby, the cost is reduced.

Naturally, although such reagent refined with high purity can be used, the cost is inevitably increased. Further, it is preferable that the chemical strengthening salt used in this invention contains no addition agent for preventing consolidation. This is because the addition agent for preventing the consolidation may contain a large number of particles.

Low temperature type chemical strengthening is preferable as the chemical strengthening method. In such low temperature type chemical strengthening, ion exchange is carried out within a region not exceeding a glass transition temperature. Potassium nitrate, sodium nitrate, or nitrate salt mixed them, potassium sulfate, sodium sulfate, or sulfate salt mixed them, or NaBr, KBr and salt mixed them can be used as alkali solvent salt used in the chemical strengthening processing liquid.

In this case, aluminosilicate glass, soda-lime glass, and borosilicate glass are exemplified as the glass substrate. A glass substrate for a magnetic recording medium, a glass substrate for an optical recording medium, and a glass substrate for an electro-optical recording medium are exemplified as the glass substrate for the information recording medium.

In particular, this invention achieves a remarkable effect with respect to the magnetic disk for the magneto-resistive head and the substrate thereof.

Subsequently, description will be made about a method of manufacturing the magnetic recording medium (the magnetic disk) according to this invention.

In this invention, the magnetic recording medium is manufactured by forming at least a magnetic layer on the above glass substrate for the magnetic recording medium according to this invention.

According to this invention, the attachment of the particles, which cause the thermal asperity or the head crush, can be effectively suppressed. In consequence, when the magnetic recording medium having the magnetic layer on the glass substrate is fabricated, it is difficult to form the island portions formed by the particles, which cause the thermal asperity, on the principal surface of the glass substrate. Thereby, the thermal asperity or the head crush can be prevented with higher level.

For example, the low glide height of the 1.2μ inch or less can be also realized because the island portions are not formed. In particular, the magnetic recording medium, which reproduces by the magneto-resistive head, can sufficiently achieve function as the magneto-resistive head. Further, the magnetic recording medium can sufficiently achieve performance thereof as the magnetic recording medium of CoPt base and the like because it can be suitably used for the magneto-resistive head.

Moreover, no defect occurs for a film, such as, the magnetic layer by the particles which cause the thermal asperity. As a result, no error due to the defect takes place.

The magnetic recording medium generally has the predetermined flatness and surface roughness, and is manufactured by successively laminating an underlying layer, an magnetic layer, a protection layer, and a lubricant layer on the glass substrate for the magnetic disk in which the chemical strengthening process is performed for the surface as needed.

The underlying layer is selected in relation to the magnetic layer. At least one metal selected from a group consisting of nonmagnetic metals, Cr, Mo, Ta, Ti, W, V, B, Al, Ni may be used as a material of the underlying layer (including a seed layer). The metal Cr or the Cr alloy is preferably used as the material of the underlying layer to enhance a magnetic characteristic where the magnetic layer includes Co as a main component. In addition, the underlying layer may not always be formed by a single layer but may be formed by a multi-layer composed of a plurality of identical or different layers. For example, deposition may be made as the underlying layer formed by the multi-layer, such as, Cr/Cr, Cr/CrMo, Cr/CrV, NiAl/Cr, NiAl/CrMo, and NiAl/CrV.

In this invention, no limitations are imposed as to the magnetic layer also.

The magnetic layer may be, for example, a layer which contains Co as a main component and which has a composition selected from CoPt, CoCr, CoNi, CoNiCr, CoCrTa, CoPtCr, CoNiPt, CoNiCrPt, CoNiCrTa, CoCrTaPt, CoCrPtB, and CoCrPtSiO. In addition, the magnetic layer has a multi-layer structure (for example, CoPtCr/CrMo/CoPtCr, CoCrTaPt/CrMo/CoCrTaPt). Such a structure is obtained by dividing a magnetic film by a nonmagnetic film (for example, Cr, CrMo, CrV) to reduce a noise, as known in the art. The magnetic layer for the magneto-resistive head (MR head) or the giant magneto-resistive head (GMR head) contains impurity elements selected from a group consisting of Y, Si, rare-earth elements, Hf, Ge, Sn and Zn, oxides of these impurity elements in addition to the Co-based alloy.

Further, the magnetic layer may have a granular structure wherein magnetic grains, such as Fe, Co, FeCo and CoNiPt, are dispersed in the nonmagnetic film comprising a ferrite-based material, an iron-rare earth-based material, $SiO_2$, and BN. Further, the magnetic layer may have a recording form of either an in-plane magnetization type or a perpendicular magnetization type.

No restrictions are imposed as to the protection layer also according to this invention. Specifically, the protection layer may be formed by a chromium film, a chromium alloy film, a carbon film, a zirconia film and a silica film and may be successively deposited on the glass substrate together with the underlying layer and the magnetic layer by the use of the known in-line sputtering apparatus. The protection layer may be formed by a single layer or a multi-layer including a plurality of layers of an identical material or different materials.

In addition, the other protection layer, such as a $SiO_2$ film, may be used instead of the above protection layer. Such a $SiO_2$ film may be formed on the chromium film by dispersing colloidal silica fine grains in tetraalkoxysilane diluted with an alcohol-based solvent and thereafter by coating and baking the dispersed grains.

Moreover, the lubricating layer is not restricted to the above. For example, the lubricating layer is formed by diluting perfluoropolyether (PFPE) with a solvent, such as freon-based solvent, and applying it on the medium surface by a dipping method, a spin coating method, or a spraying method, and firing the medium.

DESCRIPTION OF PREFERRED EMBODIMENTS

Figure 1:
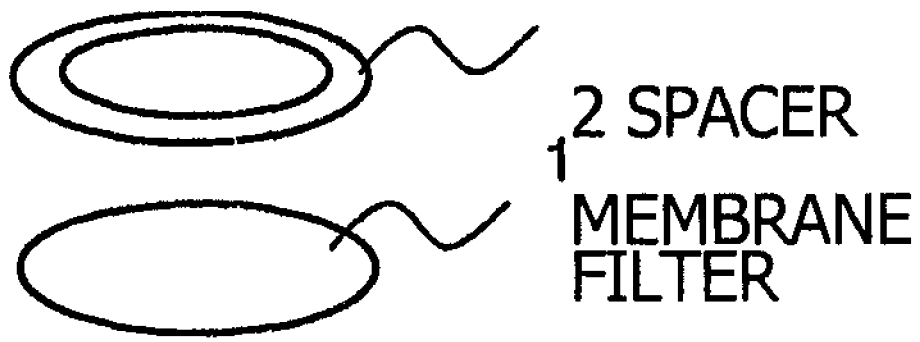
FIG. 1 is an exploded perspective view of a filter holder used in an embodiment according to this invention.

Hereinafter, detail description will be made about this invention with examples.

Example 1 and Comparative Example 1

(1) Roughing Step

First, a sheet glass of aluminosilicate is formed by a down draw method and is cut by a grinding wheel into a disc-shaped glass substrate which has a diameter of 96 mm and a thickness of 3 mm. The glass substrate is lapped or polished to a diameter of 96 mm and a thickness of 1.5 mm by a relatively rough diamond grindstone.

In this case, the disc-shaped glass substrate may be formed by directly pressing a melting glass with a cope, a drag and a drum instead of the down draw method. Alternatively, the glass substrate may be formed by the use of a float method.

In this event, the above-mentioned glass which is chemically strengthened contains, by mol %, 57-74% of $SiO_2$, 0-2.8% of $ZnO_2$, 3-15% of $Al_2O_3$, 7-16% of $Li_2O$, and 4-14% of $Na_2O$ as main components.

For example, the above-mentioned composition can be expressed in terms of a mol representation and comprises, by mol %, 67% of $SiO_2$, 1.0% of $ZnO_2$, 9.0% of $Al_2O_3$, 12.0% of $Li_2O$ and 10.0% of $Na_2O$.

Subsequently, the both principal surfaces of the glass substrate are ground or lapped by a diamond grindstone having grains smaller than those of the above grindstone. In this case, a load was set to the extent of 100 Kg. Thereby, the principal surface 3 of the glass substrate 1 was ground into a surface roughness Rmax (measured by JIS B 0601) of about 10 μm.

Next, an opening was formed at a center portion of the glass substrate by using the cylindrical grindstone. Further, the outer side end surface is ground to a diameter of 95 mm. Thereafter, the outer and inner side end surfaces were chamfered. In this case, the side end wall of the glass substrate had a surface roughness Rmax of about 4 μm.

(2) Lapping Step

Subsequently, the lapping step was performed for the glass substrate to improve dimension and shape accuracy. The lapping step is carried out by using a lapping apparatus. In this case, the lapping step is conducted two times by changing grain degrees from #400 to #1000.

Specifically, the lapping was performed for the both principal surfaces of the glass substrate so that the principal surfaces had a surface accuracy of 0-1 μm and the surface roughness Rmax of about 6 μm. In this event, the lapping was carried out by rotating an inner gear and an outer gear by the use of alumina grains having a grain degree of #400 on the condition that the load L was kept at about 100 Kg.

Next, the lapping is performed by changing the grain degree of the alumina grain into #1000. As a result, the surface roughness Rmax becomes about 2 μm. Subsequently, the glass substrate 1 was immersed in washing units by using natural detergent and water to be washed.

(3) Mirror Finishing Step of the Side End Surface

The end surface of the glass substrate was polished by the use of a brush by rotating the glass substrate so that the end surface had the surface roughness Rmax of 1 μm and the surface roughness Ra of 0.3 μm. Next, the glass substrate was washed with water after the mirror finish process of the end surface.

(4) First Polishing Step

Next, first polishing was performed by a polishing apparatus to remove a defect and a distortion remaining in the above lapping process. Specifically, a hard polisher (which may be a cerium impregnated foamed urethane pad, such as MHC15 made by Speedfam) was used as a polisher and the first polishing was performed the following polishing condition.

Polishing liquid: oxide cerium+water
Load: 300 g/cm$^2$ (L=238 kg)
Polishing time: 15 minutes
Removing amount: 30 μm
Revolution of lower surface plate: 40 rpm
Revolution of upper surface plate: 35 rpm
Revolution of inner gear: 14 rpm
Revolution of outer gear: 29 rpm The glass substrate 1 was washed by being successively dipped in washing units of natural detergent, pure water, IPA (isopropyl alcohol), IPA (vapor drying) after the first polishing.

(5) Second Polishing Step

Next, second polishing was conducted by changing the above hard polisher into a soft polisher (which may be a polishing pad of a suede type, such as Politex made by Speedfam) by using the polishing apparatus used in the first polishing process. The polishing condition is similar to the first polishing step except for the load of 100 g/cm$^2$, the polishing time of 5 minutes and the removing amount of 5 μm. The glass substrate 1 was immersed in washing units of the natural detergent, the pure water, the IPA (isopropyl alcohol), the IPA (vapor drying) to be washed therein after the second polishing step. In this case, a supersonic wave was applied to each of the washing units.

(6) Preparation and Analysis Step of Chemical Strengthening Salt

Subsequently, a part of each row material sack (lot) of potassium nitrate and sodium nitrate as the raw material of the chemical strengthening newly obtained was extracted, and samples were made at every lots as follows.

First, the particles contained in the chemical strengthening salt itself were removed, and the samples of potassium nitrate and sodium nitrate, which were sufficiently cleaned, were fabricated, respectively (example 1). In this case, the cleanness was performed by dissolving the potassium nitrate and sodium nitrate in super pure water, respectively, and filtering by the use of a filter for liquid.

Further, samples of potassium nitrate and sodium nitrate, which were extracted from each row material sack and not cleaned at all, were fabricated, respectively (comparative example 1).

Fe and Cr contained in the potassium nitrate and sodium nitrate were measured by the use of the ICP (Inductively Coupled Plasma) emission spectrometry analysis as follows. The chemical strengthening salt included a variety of particles. In this case, attention was paid for metal based particles (such as iron powder, stainless steel) in which removal due to attachment is difficult and which causes defects, and the analysis was carried out. Therefore, all used jigs were made by glass or plastic to prevent dust generation of the particles from the used jigs or fitter holders.

①A part of the potassium nitrate and sodium nitrate were extracted or obtained from the samples (example 1) which were sufficiently cleaned, and the samples (comparative example 1), which were not cleaned at all, and about 200 g was weighed after a dry process was carried out during day and night at 110° C. The samples ware dissolved in hot water made by heating the super pure water, and the obtained solution was filtered by the use of a membrane filter (maximum capturing particle diameter: 0.2 μm) made by PTFE (polytetrafluoroethylene) in which a hydropholic process was performed. This membrane filter was dipped in acid water solution (hydrochloric acid, nitric acid, sulfuric acid, hydrofluoric acid, acid mixture of them) containing aquaregia (hydrochloric acid 3: nitric acid 1) of 2 ml, and recovering substances captured on the filter were dissolved. Pure water was added for the obtained acid water solution, and was set to 50 ml.

② The analysis was conducted by the use of the ICP (Inductively Coupled Plasma) emission spectrometry analysis (SPS-1200 VR made by Seiko Instruments Inc.).

First, solutions of concentration of known four points were prepared with respect to Fe and Cr, and these elements were quantified by the absolute calibration curve by the use of the above-mentioned ICP (Inductively Coupled Plasma) emission spectrometry analysis. The measuring condition is represent as follows.

TABLE 1

|  | Element | |
| --- | --- | --- |
|  | Fe | Cr |
| Sample Dilution Ratio | 40 g/50 ml | |
| Standard Solution (ppb) | 5, 50, 500, 5000 | |
| Wavelength (nm) | 259.940 | 267.716 |
| BG Correction | 0/0 | |
| Mode | P | D |
| Integration Time | 1 sec | |
| Number of Times of Integration | 3 | |
| RF Power | 1.8 kW | |
| Measurement Height | 11.6 mm | |

③ The elements were quantified by the use of the above-mentioned ICP (Inductively Coupled Plasma) emission spectrometry analysis by using the samples obtained in the above ① under the same measuring condition as the above case. Measuring concentration was determined from the calibration curve obtained in the above ②. Herein, it is to be noted that conversion from the measuring concentration to the sample concentration was determined from the following relation equation (1).

$$\text{Content in the sample [ppb]} = ICP \text{ measuring value [mg/1]} \times 10^9 [ppb] \times \text{flask capacity [ml]} / 1000 [ml/1] / \text{sample weight [mg]} \quad (1)$$

As a result of the measurement, the content was 500 ppb or less in the example 1 while the content was exceeding 500 ppb in the comparative example 1. The result is represented by Table 2. In this case, it has been confirmed that variation exists between the lots.

TABLE 2

|  | KNO3 | | NaNO3 | |
| --- | --- | --- | --- | --- |
|  | Fe | Cr | Fe | Cr |
| Example 1 | 18.9 | 1.8 | 4.1 | 0.5 |
| Comparative Example 1 | 566.9 | 45.5 | 577.2 | 39.4 |

(ppb)

(6') Preparation Step of Chemical Strengthening Processing Liquid

The particles contained in the chemical strengthening salt itself were removed, and the samples of potassium nitrate and sodium nitrate, which were sufficiently cleaned, were prepared, respectively.

Specifically, the potassium nitrate and sodium nitrate were dissolved in super pure water, respectively, and the particles contained in the chemical strengthening salt itself were removed by the use of a filter for liquid.

The particles contained in the potassium nitrate and the sodium nitrate were measured by a particle counter for liquid, respectively. In detail, the potassium nitrate and the sodium nitrate were dissolved in the super pure water of 90 ml with 10 g, respectively. Herein, it is to be noted that the super pure water means water which is sufficiently cleaned and does not contain the particles that give an affect for the measurement.

The solution was successively measured three times by the particle counter for the liquid with 5 ml. In this case, the particle counter is made by Lion Ltd. in the case of the particle diameter of 0.2 μm or more and not exceeding 2.0 μm while the particle counter is made by PMS Ltd. in the case of the particle diameter of 2.0 μm or more.

Further, the number of the particles (the total of the particle number in each particle size) contained per 1 ml was determined and converted, and these average values were decided as the particle number.

As a result, the number of the particles contained in the sodium nitrate was higher than the number of the particles contained in the potassium nitrate. The number of the particles contained in the sodium nitrate was 1912/ml in the particle diameter of 0.2 μm or more and not exceeding 0.3 μm, 1192/ml in the particle diameter of 0.3 μm or more and not exceeding 0.5 μm, 161/ml in the particle diameter of 0.5 μm or more and not exceeding 1.0 μm, 10/ml in the particle diameter of 1.0 μm or more and not exceeding 2.0 μm, 310/ml in the particle diameter of 2.0 μm or more and not exceeding 3.0 μm, 111/ml in the particle diameter of 3.0 μm or more and not exceeding 4.0 μm, 60/ml in the particle diameter of 4.0 μm or more and not exceeding 5.0 μm, 36/ml in the particle diameter of 5.0 μm or more and not exceeding 6.0 μm, 169/ml in the particle diameter of 6.0 μm or more, 686/ml in the particle diameter of 2.0 μm or more, and 3275/ml in the particle diameter of 0.2 μm or more and not exceeding 2.0 μm.

The total number of the particles having the particle diameter of 0.2 μm or more was 3961/ml, and the ratio of the particles having the particle diameter of 0.2 μm or more was 17.3%.

(7) Chemical Strengthening Step

Chemical strengthening processing liquid was obtained by mixing and dissolving potassium nitrate and sodium nitrate with 60% and 40% (total: 73.5 kg) by using the chemical strengthening salt analyzed in the above-mentioned step of (6) or (6'). The obtained chemical strengthening processing liquid was heated up to 400° C., and the glass substrate which was washed and preheated to 300° C., was dipped in the chemical strengthening liquid solution for 3 hours.

The chemical strengthening step was carried out so that the entire surface of the glass substrate was chemically strengthened with a plurality of glass substrates retained at the end surface in a holder.

Under the circumstances, lithium ions and sodium ions on a surface layer of the glass substrate were replaced by sodium ions and potassium ions in the chemical strengthening processing liquid by dipping each glass substrate in the chemical strengthening processing liquid. Thus, the glass substrate is chemically strengthened.

A compressive stress layer formed in the surface layer of the glass substrate had a thickness of about 100-200 μm. Next, the chemically strengthened glass substrate was dipped in a water tank of 20° C., quickly cooled and retained for 10 minutes.

Subsequently, the cooled glass substrate was dipped in a sulfuric acid heated up to 40° C., and was washed by the supersonic wave.

The surface roughness Ra of the glass substrate obtained via the above-mentioned process falls within the range between 0.5 nm and 1 nm.

The glass surface was observed by the use of the optical microscope. As a result, the island portion, which causes the thermal asperity and the head crush, was not detected in the example 1. On the other hand, the island portion, which causes the thermal asperity and the head crush, was detected in the comparative example 1.

(8) Magnetic Disk Manufacturing Step

A seed layer (a film thickness of 40 nm) of NiAl (Ni: 50 at %, Al: 50 at %), an underlying layer (a film thickness: 25 nm) of CrMo (Cr: 94 at %, Mo: 6 at %), a magnetic layer (a film thickness: 27 nm) of CoCrPtTa (Co: 75 at %, Cr: 17 at %, Pt: 5 at %, Ta: 3 at %), and a hydrogenation carbon protection layer (a film thickness: 10 nm) were successively deposited on the both surfaces of the glass substrate for the magnetic disk obtained in the above-mentioned step by using the known in-line sputtering apparatus.

Further, a liquid lubricant material layer (a film thickness: 1 nm) made by perfluoropolyether was formed on the protection layer by the use of the dip method to obtain the magnetic disk for the MR head.

(Evaluation)

A glide test (the glide height: 1.2μ inch, peripheral speed: 8 m/s) (1500 samples) was performed in connection with the obtained magnetic disk. As a result of the test, hit (the head contacts with the projection on the surface of the magnetic disk) and crash (the head collides with the projection on the surface of the magnetic disk) did not occur in the example 1. Further, it has been confirmed that no defect occurred for the film, such as, the magnetic layer by the particles which cause the thermal asperity.

In addition, a reproduction test was performed for the magnetic disk of this example after the glide test by the use of the magneto-resistive type head. As a result of the test, it has been confirmed that no reproduction errors due to the thermal asperity take place in connection with the samples (500 samples).

The glass substrate for the magnetic disk and the magnetic disk were fabricated in the same manner as the example 1 except that the chemical strengthening salt, which was not cleaned, was used to make the chemical strengthening processing liquid, and the same evaluation was carried out in the comparative example 1.

The concentration of Fe and Cr contained the chemical strengthening salt exceeded 500 ppb in the comparative example in which the chemical strengthening was performed by the chemical strengthening processing liquid which was not cleaned. During the chemical strengthening step, ratio, in which the island portion was formed, became excessively high, and a height and a destiny of the island portion became high. Further, faulty ratio was high in the glide test (5000 samples) of 1.2 μinch height. Moreover, although the reproducing test (500 samples) was performed, the probability of the reproduction error due to the thermal asperity was also high.

Examples 2-5

Subsequently, the glass substrate was fabricated in the same manner as the example 1 except that a several kinds of chemical strengthening salts, in which contents of Fe and Cr were adjusted, were prepared in a refining process of the salt. In this case, the content of Fe and Cr contained each salt was measured in the same manner as the example 1.

Example 2

$KNO_3$: 3.4 ppb (Fe), 0.5 ppb (Cr)
$NaNO_3$: 3.3 ppb (Fe), 0.8 ppb (Cr)

Example 3

$KNO_3$: 74.2 ppb (Fe), 12.5 ppb (Cr)
$NaNO_3$: 13.0 ppb (Fe), 3.3 ppb (Cr)

Example 4

$KNO_3$: 195.5 ppb (Fe), 10.3 ppb (Cr)
$NaNO_3$: 36.2 ppb (Fe), 5.7 ppb (Cr)

Example 5

$KNO_3$: 478.2 ppb (Fe), 22.6 ppb (Cr)
$NaNO_3$: 87.9 ppb (Fe), 45.5 ppb (Cr)

When the glass surface of the obtained glass substrate was observed by the use of the optical microscope, the island portion, which caused the thermal asperity or the head crush, was not detected. It has been confirmed that the height or the generation ratio or the density of the island portion becomes higher as the content of Fe or Cr contained in the chemical strengthening salt ($KNO_3$, $NaNO_3$) is higher. However, the height of the island portion was smaller than the height of the island portion in the comparative example 1, and did not cause the thermal asperity and the head crush.

Example 6 and Comparative Example 2

The glass substrate for the magnetic disk and the magnetic disk were fabricated in the same manner as the example 1 and the comparative example 1 except that the analysis of the chemical strengthening salt was carried out by the use of the SEM, and the same evaluation was performed. In this case, the analysis was carried out as follows.

① The chemical strengthening salt included a variety of particles. Attention was paid for the metal based particles (such as iron powder, stainless steel piece), which the removal due to the attachment is difficult and cause the defects, and the analysis was carried out. Therefore, all used jigs were made by glass or plastic to prevent dust generation of the particles from the used jig or filter holder.

The used jig was washed in advance by using pure water in a clean room. A vial bottle was attached with neutral detergent in BEMCOT (made by Nabelin Co., Ltd.), and an internal, a spout, and a cap of the bottle were washed twice to remove the detergent.

Thereafter, a membrane filter unit of 0.2 μm was attached to an injector, and the filter holder (including the membrane filter having a diameter of 13 mm and a minimum capturing diameter of 0.2 µm) was mounted at the tip thereof, and the internal of the vial bottle was suitably rinsed in filtered pure water (hereinafter, referred to as pure water). A pincette made by ceramic was suitably rinsed at the tip edge in predetermined pure water. The filter holder was suitably rinsed in the predetermined pure water.

In this time, an attached spacer for fixing the filter was fitted to the filter holder, and were rinsed together. The jig after washing was placed on a clean BEMCOT, and attention was paid such that the particles were not attached thereto again.

As illustrated in FIG. 1, a spacer 2 and a membrane filter 1 are set between washed filter holders A and B by using the pincette made by ceramic. Herein, it is to be note that the membrane filter 1 has a diameter of 13 mm and a minimum capturing particle diameter of 0.2 µm. In this event, the holder is tightly fixed such that liquid is not leaked from between the filter holders A and B.

② A side of the filter holder was mounted to the injector (without an injector needle) of 50 ml, and the samples (salt 200 g, potassium nitrate cleanness, non-cleanness, solution) are injected in the injector. In this case, after the samples are sucked by the injector (without the injector needle), the samples may be attached to the A side of the filter holder. Herein, the injector needle was made by metal, and was not used because the dust generation might be occurred.

The samples were injected in the filter by pushing a piston of the injector, and a flittering process was carried out. In this event, the piston was not pushed in one breath, and the piston was pushed such that extracted liquid was dropped. Further, when bubbles exist inside the filter holder A, a large pushing force is necessary, and nonuniformity appears in obtaining contaminants. Therefore, presence and absence of the bubbles was confirmed.

After the filtering process, the predetermined pure water of 10 ml pour three times and flushing to remove potassium and sodium from the top of the filter. When they are remained or left with large quantity on the filter, the SEM observation becomes difficult by charge-up, and an accurate analysis can not be performed during the EDX analysis (energy dispersion type X ray spectroscopy analysis) because they disturb.

Under this circumstance, when the hot pure water is used, the flushing can be readily conducted. In this case, the filter is inserted into a desiccator containing drying material for about 24 hours to remove water.

③ The obtained membrane filter is placed on a carbon sample stand, and an edge is formed by the use of carbondortite. In this case, the dortite is not applied for an entire periphery, and a space of about 2 mm is formed. Thereby, air entered between the membrane filter and a both surface tape can be removed in vacuum removal during vaporizing described later. The vaporizing is performed by the use of platinum palladium for 30 seconds with 10 mA to obtain the sample for the SEM analysis. In consequence, the observation and the analysis can be carried out with an acceleration voltage of 15 kV with no problem.

The SEM observation was performed by the use of the obtained sample for the SEM analysis. As the condition thereof, the observation was made by the use of the back-scattered electron image detector or the secondary electron detector with a voltage of 15 kV and WD of 15 mm. In this case, when the SEM apparatus having the back-scattered electron image detector was used, the filter containing much carbon was reflected with black while metal or glass clearly reflects with white by an atom number effect in which an object can more clearly viewed as the atom number is higher. Consequently, the SEM apparatus is extremely convenient for visual observation or picture judgement and counting accuracy is also enhanced. In the case of secondary electron image, it is difficult to distinguish the filter from the contaminant.

Figure 2:
FIG. 2 is a SEM picture showing an analysis result of chemical strengthening salt according to the other embodiment of this invention.
Figure 3:
FIG. 3 is a SEM picture showing an analysis result of chemical strengthening salt according to the other embodiment of this invention.
Figure 4:
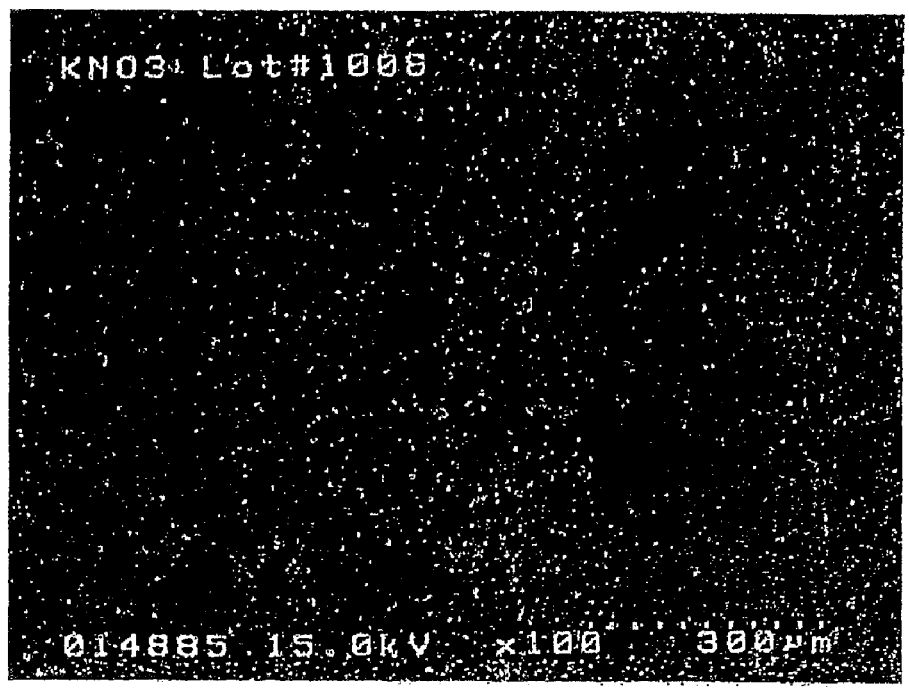
FIG. 4 is a SEM picture showing an analysis result of chemical strengthening salt according to a comparative example.
Figure 5:
FIG. 5 is a SEM picture showing an analysis result of chemical strengthening salt according to the other comparative example.

The stage is moved to a location in which the particles are remarkable, and an entire image (magnification of 100 times) and an enlarged image (magnification of 500 times) were pictured, respectively. In this case, FIG. 2 shows the entire image (magnification of 100 times) about $KNO_3$ in the example 2, and FIG. 3 shows the enlarged image (magnification of 500 times). FIG. 4 shows the entire image (magnification of 100 times) about $KNO_3$ in the comparative example 2, and FIG. 5 shows the enlarged image (magnification of 500 times). From these pictures, the quantity of the particles can be determined per a unit area. In this event, when an entire screen is charged-up by the particles during the observation, the process is again started from the initial step.

Successively, the EDX (Energy Dispersion type X ray spectroscopy method) analysis (ESCA (Electron Spectroscopy for Chemical Analysis), SIMS (Secondary Electron Mass Analyzing method) may be used) is carried out. As the condition thereof, the EDX analysis was preformed by the use of the back-scattered electron image detector with acceleration voltage of 15 kV and WD of 15 mm. Element analysis was carried out by randomly selecting the particles of 10 points from a viewing field of magnification of 500 times. Thereby, element, which constitutes the particle contained in the chemical strengthening salt, is judged.

④ As a result of the measurement, the quantity of the particles (such as iron powder and stainless steel piece) having the particle diameter of 0.2 µm or more was 30 samples/$mm^2$ or less (25 samples/$mm^2$ or less) in the example 2. In the meantime, the quantity of the particles (such as iron powder and stainless steel piece) having the particle diameter of 0.2 µm or more was more than 900 samples/$mm^2$ (915 samples/$mm^2$) in the comparative example 2.

(Evaluation)

When the glass surface before the magnetic film was deposited was observed by the use of the microscope, the island portion, which caused the thermal asperity or the head crush was not detected in the example 2 while the island portion, which caused the thermal asperity or the head crush was detected in the comparative example 2.

A glide test (the glide height: 1.2µ inch, peripheral speed: 8 m/s) (1500 samples) was performed in connection with the obtained magnetic disk. As a result of the test, the hit and the crash did not occur in the second example. Further, it has been confirmed that no defect occurred for the film, such as, the magnetic layer by the particles which cause the thermal asperity.

In addition, a reproduction test was performed for the magnetic disk of this example after the glide test by the use of the magneto-resistive type head. As a result of the test, it has been confirmed that no reproduction errors due to the thermal asperity take place in connection with the samples (500 samples).

On the other hand, the faulty rate was high (10%) in the glide test (5000 samples) of the 2µ inch height in the comparative example 2, and when the reproduction test (500 samples) was performed, the probability of the reproduction error due to the thermal asperity was also high.

Examples 7-9

Subsequently, the glass substrate was fabricated in the same manner as the example 7 except that a several kinds of chemical strengthening salts, in which contents of Fe and Cr were adjusted, were prepared in a refining process of the salt.

In this case, the contents of Fe and Cr contained each salt were measured in the same manner as the example 7.

Example 7: 87 samples/mm² (particles of 0.2 μm or more)

Example 8: 292 samples/mm² (particles of 0.2 μm or more)

Example 9: 485 samples/mm² (particles of 0.2 μm or more)

When the glass surface of the obtained glass substrate was observed by the use of the optical microscope, the island portion, which caused the thermal asperity or the head crush, was not detected. It has been confirmed that the height, the generation ratio, and the density of the island portion became higher as the content of Fe or Cr contained in the chemical strengthening salt (KNO3, NaNO3) was higher. However, the height of the island portion was smaller than the height of the island portion in the comparative example 1, and did not cause the thermal asperity and the head crush.

Example 10 and Comparative Example 3

In the example 6 and the comparative example 2, the filter after the flittering may be visually observed, compared a color and correlation between the color and the above SEM analysis result may be obtained. Thereby, the quality of the chemical strengthening salt can be judged, and therefore, this is an effective means.

For example, the membrane filter was taken out from the filter holder, and water was completely removed by the use of Kimwipe (made by Nabelin Co., Ltd.). In this event, when crystal of the salt was visually detected on the membrane filter, the process was again started from the initial step because the flushing might be not sufficiently performed.

Next, only the membrane filter was pinched by a transparent adhesive sheet (for example, made by Mieko Ltd.: Pouch and the like), and was tightly covered. This is because the color is changed later when the membrane filter is tightly covered with a paper.

Subsequently, the membrane filter, which was tightly covered, was placed on a white paper, and was tightly covered again. The membrane filter was colored to a brown-based color, and therefore, the white paper was used as an underlying paper.

As a result of the correlation with the above SEM analysis result, defective product occurred when the color after the filtering was deeper than a constant reference level. In the case of almost no color or light color, no defective product occurred.

Example 11 and Comparative Example 4

The glass substrate for the magnetic disk and the magnetic disk were fabricated in the same manner as the example 1 and the comparative example 1 except that the analysis of the chemical strengthening salt was carried out by the use of calorimetric analysis, and the similar evaluation was performed. In this event, the analysis was carried out as follows.

In such colorimetric analysis, it is necessary to use color except for black color, the gray color, and the red brown color when the chemical strengthening salt is analyzed by the calorimetric analysis. The colorimetric analysis was carried out by resolving 200 g salt in a solution and filtering the solution by the use of a filter having a filter size of 13 mm φ and a mesh size of 0.2 μm.

As a result a correlation with the above IPC analysis result, the black color and the gray color corresponds to stainless steel, and the red brown color corresponds to rust (iron oxide). When these colors appear the stainless steel or iron oxide is contained with 500 ppb or more in concentration and defective product occurred. In the case of almost no color and light facing color, no defective product occurred.

Example 12

The glass substrate for the magnetic disk and the magnetic disk were fabricated in the same manner as the example 1 and the comparative example 1 except that the analysis of the chemical strengthening salt was carried out by the use of the particle counter, and the similar evaluation was performed. In this event, the analysis is carried out as follows.

①The chemical strengthening salt (newly obtained potassium nitrate) of 5.000 g was entered into a clean vial bottle to make samples, and super pure water pf 50 ml, which was filtered by the filter of 0.2 μm, was added, and was covered. This vial bottle was dipped in hot water of 50° C. to dissolve the chemical strengthening salt. In this case, it has been confirmed that the chemical strengthening salt was not recrystallized when the temperature of the solution was lowered to the room temperature.

② In the meantime, the optical dispersion type automatic particle counter (made by RION Ltd.: KL-20 type) is used as the particle counter in liquid, and IPA (isopropyl alcohol) of 10 ml poured from a sample injection inlet of the particle counter five times, and was flushed.

Successively, reference liquid (background) was prepared in a washed beaker. In this case, super pure water of 60 ml, which was filtered by the filter of 0.2 μm, was silently entered. Further, this reference liquid of 10 ml poured five times as the same manner as the above case to completely discharge IPA.

③ Successively, the reference liquid of 10 ml pours five times in the same manner as the above case, and, the number of the particles is countered, and the particle number in the reference liquid is determined at every particle diameter from an average value of late three times. In this case, when the count of 0.2 μm is 200 or more in the count of the later three times, or when the count of total five times is 300 or more, the reference liquid is again made to perform the count again.

④ The solution of 1.0 ml of the chemical strengthening salt manufactured in ① is added to the reference liquid of 500 ml, and is slowly agitated. The sample pours five times in the same manner as the above case, and the count of the particle number is carried out, and the particle number in the sample liquid is determined at every particle diameter from an average value of the later three times.

⑤ The increasing number of the particle number of 10 ml is determined from the following equation.

The increasing number of the particle number=the particle number in the sample liquid−the particle number in the reference liquid.

The particle number of impurity in the chemical strengthening salt of 1 g is determined from the following equation.

The increasing number of the particle number in 10ml/[(5g/50ml)×(1ml/500ml)×10ml]

As a result, the number of the particles contained in the sodium nitrate was higher than the number of the particles contained in the potassium nitrate. The number of the particles contained in the sodium nitrate was 1912/g in the particle diameter of 0.2 μm or more and not exceeding 0.3 μm, 1192/g in the particle diameter of 0.3 μm or more and not exceeding 0.5 μm, 161/g in the particle diameter of 0.5 μm or more and not exceeding 1.0 μm, 10/g in the particle diameter of 1.0 μm or more and not exceeding 2.0 μm, 310/g in the particle diameter of 2.0 μm or more and not exceeding 3.0 μm, 111/g in the particle diameter of 3.0 μm or more and not exceeding 4.0 μm, 60/g in the particle diameter of 4.0 μm or more and not exceeding 5.0 μm, 36/g in the particle diameter of 5.0 μm or more and not exceeding 6.0 μm, 169/g in the particle diameter of 0.6 μm or more, 686/g in the particle diameter of 2.0 μm or more, and 3275/g in the particle diameter of 0.2 μm or more and not exceeding 2.0 μm.

The total number of the particles having the particle diameter of 0.2 μm or more was 3961/g, and the ratio of the particles having the particle diameter of 0.2 μm or more was 17.3%.

(Evaluation)

When the glass surface before the magnetic film was deposited by the use of the optical microscope, the island portions, which cause the thermal separate and the head crush, did not detected.

A glide test (the glide height: 1.2μ inch, peripheral speed: 8 m/s) (1500 samples) was performed in connection with the obtained magnetic disk. As a result of the test, the hit and the crash did not occur. Further, it has been confirmed that no defect occurred for the film, such as, the magnetic layer by the particles, which cause the thermal asperity.

In addition, a reproduction test was performed for the magnetic disk of this example after the glide test by the use of the magneto-resistive type head. As a result of the test, it has been confirmed that no reproduction errors due to the thermal asperity take place in connection with the total of a plurality of samples (500 samples).

Example 13-15 and Comparative Example 5

Subsequently, the glass substrate for the magnetic disk and the magnetic disk were fabricated in the same manner as the example 11 except that the chemical strengthening salts different in the number of the particles were prepared to make the chemical strengthening processing liquid, and the same evaluation was carried out. In this case, the chemical strengthening salt, which was not cleaned, was used in the comparative example.

Table 3 shows the number of the particles (the particle diameter of 2 μm or more, the particle diameter of 0.2 μm or more and not exceeding 2.0μ, these total) of the chemical strengthening salt (sodium nitrate), the height of the island portion (average value), the density of the island portions (average value), and the result (faulty rate) (5000 samples) of the glide test of the magnetic disk.

In the examples 6~8 and the comparative example 5, the ratios of the particles of 2.0 μm or more among the total particles having the diameter of 0.2 μm or more were 18.2 (example 12), 15.0% (example 13), 22.1% (example 14), and 25.3% (comparative example 5).

tained in the chemical strengthening processing liquid was reduced). Thereby, it has been found out that the island portions, which were formed on the surface of the glass substrate, could be effectively reduced, and further, the result of the reproduction test due to the magneto-resistive head was excellent in the glide test.

In particular, the island portion was not be formed when the number of the particles having the particle diameter of 0.2 μm or more was 4000/g or less (the number of the particles having the particle diameter of 2.0 μm or more was 700/g or less). Therefore, it is preferable because no defect takes place in the glide test.

In the meantime, when the number of the particles having the particle diameter of 0.2 μm or more contained in the chemical strengthening salt exceeds 120000/g, in particular, when the ratio of particles of the particle diameter of 2.0 μm or more exceeds 25%, the ratio of the formation of the island portion becomes high during the chemical strengthening step, the height of the island portion exceeds 30 nm, and the density of the island portions exceeds 0.002/mm².

In consequence, the faulty rate (the ratio of the hit or the head crush) was high in the glide test of the 1.2μ inch height. Further, although the reproduction test (500 samples) was performed, the probability of the reproduction error due to the thermal asperity became higher as the faulty rate of the glide test was also higher.

Meanwhile, the number of the particles having the particle diameter of 0.2 μm or more contained in the chemical strengthening salt was 193200/g in the comparative example 5 in which the chemical strengthening was performed in the chemical strengthening processing liquid which was not cleaned.

During the chemical strengthening step, the ratio of the formation of the island portion becomes excessively high, the height of the island portion was 100 nm, and the density of the island portions was 0.0027/mm².

Further, the faulty rate was high (10%) in the glide test (5000 samples) of the 1.2μ inch height. Moreover, although the reproduction test (500 samples) was performed, the probability of the reproduction error due to the thermal asperity was high.

When the island portions formed in the examples 14-15 and the comparative example were analyzed and observed, the component of the island portion contained iron. Further, the island portion, in which a solid-like particle was attached, and the island portion, in which the particle (iron) was strongly attached by the oxidation reaction in the chemical strengthening step and the applied heat, were observed.

TABLE 3

| | Evaluation Item | Example 5 | Example 6 | Example 7 | Example 8 | Comparative Example 5 |
|---|---|---|---|---|---|---|
| Number of particles/g | particles ≧ 2.0 μm | 686 | 273 | 1089 | 26450 | 48790 |
| | 0.2 ≦ particles < 2.0 μm | 3275 | 1227 | 6167 | 93360 | 144410 |
| | Total | 3961 | 1500 | 7256 | 119810 | 193200 |
| Island Portion | Height (Average) | no island | no island | 12 nm | 20 nm | 100 nm |
| | Density (Average) | no island | no island | 0.0003/mm² | 0.002/mm² | 0.007/mm² |
| | Glide Test (1.2 μinch) | 0% | 0% | 0.2% | 0.5% | 10% |

Apparent from Table 3, the cleaned chemical strengthening salt was used (as a result, the number of the particles con- Further, the quantify of the particles contained in the chemical strengthening salt is previously determined as a reference setting value so as to obtain a desired glide characteristic on the basis of the result of the glide test described in Table 3. Thereby, it has been found out that the glass substrate having the desired glide characteristic for the magnetic disk, and the magnetic disk having at least the magnetic layer on the glass substrate can be manufactured.

For example, the chemical strengthening processing salt (solution salt) is obtained by using the chemical strengthening salt, in which the number of the particles having the particle diameter of 0.2 µm or more is 4000/g or less as the quantify of the particles contained in the chemical strengthening salt itself before making the chemical strengthening processing liquid, and the chemical strengthening process is carried out by the use of the chemical strengthening processing liquid. Thereby, the chemically strengthened glass substrate for the magnetic disk, which satisfies the glide height of 1.2µ inch, can be obtained.

Example 15

In the manner similar to that mentioned in conjunction with the example 1, a glass substrate for a magnetic disk and a magnetic disk were produced and subjected to the similar evaluation except that the ICP emission spectroscopy (②) in the example 1) was replaced by the X-ray fluorescence analysis using a total-reflection X-ray fluorescence spectrometer. Hereinafter, the method and the conditions of the X-ray fluorescence analysis will be described.

The X-ray fluorescence analysis comprises the steps of irradiating intense primary X-rays obtained by an X-ray tube onto a sample to generate characteristic X-rays, measuring the wavelength and the intensity of the characteristic X-rays, identifying elements contained in the sample, preparing an analytical or calibration curve considering the matrix effect by the use of a standard reagent to determine the quantities of the elements contained in the sample.

Generally, the X rays are incident at an incident angle between 30° and 90°. However, the incident angle may be between a critical angle and 30° The critical angle is a maximum incident angle exhibiting the total reflection of the incident X-rays. In the latter case, the sensitivity is high in principle. More preferably, the incident angle is on the order of ¼ to ½ of the critical angle.

In this example, the analysis was carried out by the use of the total reflection X-ray fluorescence spectrometer (TREX610 manufactured and sold by Technos Co., Ltd.). The measurement condition was as follows.

| Target | tungsten (W) (other targets may be used) |
|---|---|
| Analyzing Crystal | monochromator |
| Detector | Si(Li) SSD |
| Atmosphere | vacuum |
| Voltage | 30 kV |
| Current | 200 mA |
| Measurement Time | 500 sec |
| Incident Angle | 0.05° |

At first, for each of Fe and Cr, solutions having four levels of concentrations were prepared. By the use of the above-mentioned X-ray fluorescence spectrometer, quantitative determination of these elements was carried out in accordance with an absolute analytical curve technique under the above-mentioned conditions.

Measurement is carried out as follows. A predetermined amount of the above-mentioned solution is dropped onto a clean silicon wafer and dried. The primary X-rays are simultaneously irradiated throughout the dry residue to generate the characteristic X-rays of each of Fe and Cr. The intensities of the characteristic X-rays are measured. It is noted here that the residue may be in the liquid phase instead of the dry phase.

The result of quantitative determination was substantially equal to that obtained in the ICP emission spectroscopy in the example 1. In addition, no projections causing the thermal asperity or the head crush were observed. No reproduction error was caused by the gliding defect of the magnetic disk or the thermal asperity.

Although the glide height of 1.2µ inch is exemplified in the above-mentioned examples, the invention is not limited to the height. As mentioned before, the correlation between the glide height and the quantity of the particles contained in the chemical strengthening salt itself is determined in advance, the quantity of the particles contained in the chemical strengthening salt itself may be controlled so as to obtain the desired glide height.

Although this invention has been explained with the preferred examples, this invention is not limited to the above-mentioned examples.

For example, the filter size of and the mesh size of the filter used in the analysis are not restricted to those mentioned above. In dependence upon the analyzing method, the filter size is appropriately selected between 10 and 50 mm φ and the mesh size is appropriately selected between 0.1 and 2 µm.

For example, even when the fluorescent X-ray spectroscopy analyzing method is used instead of the ICP (Inductively Coupled Plasma) emission spectrometry analyzing method in the example 1, the quantitative analysis can be carried out in the same manner as the above case. Herein, it is to be noted that the ICP (Inductively Coupled Plasma) emission spectrometry analyzing method is superior in sensitivity and repeatability.

Further, reliability of the analysis can be enhanced by combining a plurality of analyzing methods, and product quality can be enhanced by high analyzing accuracy.

In addition, this invention can be applicable as long as the glass substrate is manufactured for use in the information recording medium through the chemical strengthening step, and can be widely applied for a variety of glass substrates for the information recording medium, such as, the glass substrate for the optical disk and the glass substrate for the magneto-optical disk. In this event, when the density of the island portions is high in the glass substrate for optical disk and the glass substrate for magneto-optical disk, an adverse affect is given for record and reproduction. Therefore, the quantity of the particles contained in the chemical strengthening salt itself is preferably controlled by taking the density of the island portions into consideration.

As mentioned above, the quantity of the particles contained in the chemical strengthening salt itself is analyzed, only the chemical strengthening salt, which passes the analysis, is used in this invention. In consequence, the attachment of the particles, which gives an adverse affect for the information recording medium by attaching the glass substrate for the information recording medium in the chemical strengthening processing liquid, can be effectively suppressed.

In particular, the formation of the island portions, which cause the thermal asperity or the head crush, can be effectively suppressed. In this case, the fine iron powder in the chemical strengthening processing liquid and the like attaches to the glass substrate, and thereby, the island portions are formed.

As a result, the information recording medium having high quality and a slight of defects can be obtained, and in particular, the low flying height can be achieved, the head crush can be prevented, and the reduction of the reproducing function due to the thermal asperity can be prevented in the magnetic disk. Further, the low flying height of 1.2μ inch or less can be realized.

What is claimed is:

1. A method of manufacturing a glass substrate for an information recording medium including a step for chemically strengthening the glass substrate by contacting the glass substrate with chemical strengthening processing liquid containing chemical strengthening salt, wherein:

the number of particles having a particle diameter of 0.2 μm or more is 120000/g or less in said chemical strengthening salt, the number being determined from a difference between the particle number in a sample dissolved with the chemical strengthening salt in a reference liquid measured by the use of a liquid particle counter and the particle number in the reference liquid.

2. A method of manufacturing a glass substrate for an information recording medium including a step for chemically strengthening the glass substrate by contacting the glass substrate with chemical strengthening processing liquid containing chemical strengthening salt, wherein:

the number of particles having a particle diameter of 0.2 μm or more is 900/mm² or less in the chemical strengthening salt when the particles contained in the chemical strengthening salt of 1 g are captured by a filter having a minimum capturing particle diameter of 0.2 μm and a diameter of 13 mm in case that secondary electron image or back-scattered electron image is observed by a scanning electron microscope by the use of a secondary electron detector or a back-scattered electron image detector.

3. A method as claimed in claim 2, wherein:

the number of the particles is 500/mm² or less in said chemical strengthening salt.

4. A method as claimed in claim 2, wherein:

the number of the particles is 30/mm² or less in said chemical strengthening salt.

5. A method of manufacturing a glass substrate for an information recording medium including a chemical strengthening step for strengthening the glass substrate by replacing a part of first ions contained in the glass substrate by second ions in a processing liquid having an ion diameter larger than the first ion by contacting the glass substrate with chemical strengthening processing liquid containing chemical strengthening salt, wherein:

the number of particles having a particle diameter of 0.2 μm or more contained in said chemical strengthening salt is 12000/ml or less.

6. A method as claimed in claim 5, wherein:

a ratio of the particles having the particle diameter of 0.2, μm or more is 25% or less in the chemical strengthening salt.

7. A method as claimed in claims 5 or 6, wherein:

the number of particles having a particle diameter of 0.2 μm or more contained said chemical strengthening salt is 4000/ml or less.

8. A method as claimed in either one of claims 5 or 6, wherein:

said particle contains iron.

9. A method as claimed in either one of claims 5 or 6, wherein:

the glass substrate for the information recording medium comprises a glass substrate for a magnetic disk.

10. A method as claimed in claims 5 or 6, wherein:

the glass substrate for the magnetic disk comprises a glass substrate for a magnetic disk which is used by combining with a magneto-resistive head or a giant magneto-resistive head.

11. A method of manufacturing an information recording medium, wherein:

at least a recording layer is formed on the glass substrate obtained by the manufacturing method of the glass substrate for the information recording medium claimed in either one of claims 5 or 6.

12. A method of manufacturing an magnetic disk, wherein:

at least a magnetic layer is formed on the glass substrate obtained by the manufacturing method of the glass substrate for the information recording medium claimed in either one of claims 5 or 6.

* * * * *